Patented Jan. 9, 1945

2,367,000

UNITED STATES PATENT OFFICE 2,367,000

METHOD OF PRODUCING HYDROXYLATED DEHYDROABIETIC ACID COMPOUNDS

William P. Campbell, Newark, Del., assignor to Hercules Powder Company, Wilmington, Del., a corporation of Delaware No Drawing. Application June 27, 1942, Serial No. 448,868

13 Claims. (Cl. 260—97)

This invention relates to an improved method for producing hydroxylated dehydroabietic acid compounds.

Hydroxy derivatives of dehydroabietic acid have been described in the literature. However, no satisfactory process capable of providing good yields of such hydroxy products has been known and the products have therefore acquired no more than theoretical interest.

Now, in accordance with this invention, it has been discovered that improved yields of hydroxylated dehydroabietic acid compounds containing the hydrocarbon nucleus of dehydroabietic acid may be obtained by heating a halogenated derivative of either dehydroabietic acid or a compound derived from dehydroabietic acid and containing the hydrocarbon nucleus of dehydroabietic acid, such as dehydroabietyl alcohol, dehydroabietinal, dehydroabietane, esters of dehydroabietic acid, salts of dehydroabietic acid, ethers of dehydroabietyl alcohol and alkoxides of dehydroabietyl alcohol, at a temperature from about 200° C. to about 320° C. with an alkali metal hydroxide or an alkine earth metal hydroxide.

The improved process may be illustrated by the following specific examples. All parts expressed in the examples represent parts by weight unless otherwise indicated.

Example I

Thirty parts of mono bromodehydroabietic acid, prepared by bromination of mono sulfodehydroabietic acid, were heated with 215 parts of water and 35 parts of potassium hydroxide in an autoclave in a nitrogen atmosphere at a temperature of 300° C. for 18 hours. The reaction mixture resulting was diluted with water, filtered while warm and the solution acidified with hydrochloric acid. The mono hydroxydehydroabietic acid which precipitated from the solution was recovered and dried. The yield was 13 parts.

Example II

Fifty parts of mono bromodehydroabietic acid were heated with 1500 parts of 12% aqueous sodium hydroxide in a copper vessel in an autoclave at a temperature of 290° C. for 15 hours in a nitrogen atmosphere. The mono hydroxydehydroabietic acid was recovered as in Example I.

Example III

Forty parts of mono chlorodehydroabietic acid were heated with 1000 parts of 12% aqueous sodium hydroxide as in Example II. The mono hydroxydehydroabietic acid produced was recovered in the same manner as in Example I.

The hydroxylated derivatives of dehydroabietic acid and dehydroabietic acid compounds containing the hydrocarbon nucleus of dehydroabietic acid produced in accordance with the process of this invention will contain one or more hydroxyl groups as substituents in the aromatic nucleus. The number of hydroxyl groups introduced will be dependent on the number of halogen atoms substituted in the aromatic nucleus of the halogenated dehydroabietic acid compound used in the process. The process is particularly adapted to production of the mono hydroxy dehydroabietic acid or dehydroabietic acid compounds from the mono halogenated products. The aromatic nucleus of the dehydroabietic acid molecule contains three unsubstituted positions. However, two of the positions are more reactive than the third and accordingly the substitution of hydroxyl groups will usually be confined to the substitution of either one or two hydroxyl groups.

The halogenated dehydroabietic acid or dehydroabietic acid compound which forms a starting point for the described process may be produced in any desired manner. A convenient procedure involves direct halogenation of sulfo derivatives of dehydroabietic acid such as mono sulfo dehydroabietic acid, sulfonated derivatives of dehydroabietic acid compounds such as sulfonated dehydroabietyl alcohol, sulfonated dehydroabietinal, sulfonated dehydroabietane, sulfonated salts of dehydroabietic acid, sulfonated ethers of dehydroabietyl alcohol, and sulfonated alkoxides of dehydroabietyl alcohol. The direct halogenation of the sulfonated derivatives in aqueous solution provides high yields of the halogenated products. Thus, bromination of mono sulfodehydroabietic acid in aqueous solution provides a 92% yield of the mono bromodehydroabietic acid. The sulfonated dehydroabietic acid or sulfonated dehydroabietic acid compounds used in preparation of the halogenated derivatives may be obtained in accordance with the procedure described in U. S. Patent 2,207,890 to Edwin R. Littmann. Other methods of preparing the halogenated dehydroabietic acid compounds may be used if desired. The brominated and chlorinated derivatives will be particularly preferred in the process since they are most easily prepared. Also, the iodo and fluoro derivatives are less reactive in the present process and thus the yields are lower and are not as desirable from this standpoint.

In carrying out the process of the invention, either an alkali metal hydroxide or an alkaline earth metal hydroxide may be employed. The alkali metal hydroxides are preferred. Thus, sodium hydroxide, potassium hydroxide, calcium hydroxide, barium hydroxide, etc. may be used. The reaction between the alkali and the halogenated dehydroabietic acid or halogenated dehydroabietic acid compound is conveniently carried out in the presence of water. Thus, an aqueous solution of the alkaline material may be used. The amount of water is not critical and, generally speaking, the alkaline material may be used in aqueous solutions having concentrations from about 1% to about 50% by weight. The amount of alkali used will generally be an excess over that required for complete reaction with the halogenated dehydroabietic acid or dehydroabietic acid compound.

In carrying out the process a temperature in the range of about 200° C. to about 320° C. will provide the hydroxylated product in good yields. The reaction is more rapid at the higher temperatures and accordingly a reaction temperature of about 280° C. to about 310° C. will be preferred. The time required for completion of the reaction will depend on the specific alkali used, the temperature of reaction, the specific halogenated material used, as well as on other factors. The time of reaction generally falls within the range of about 3 hours to about 20 hours.

In some instances it may be desirable to employ a catalyst for the reaction. The catalysts which may be used will be those which are known to be effective in replacement of halogen atoms by hydroxyl groups. Metallic copper, cupric salts or cuprous salts such as cuprous bromide, cuprous chloride, cuprous oxide, cupric oxide, etc. are desirable.

After completion of the heating period, the alkaline solution is generally cooled and filtered to remove any undissolved components. It is then acidified with any suitable acid, such as a mineral acid. The hydroxylated derivative, being insoluble or partially insoluble in water, will precipitate and may be recovered by filtration. Other methods for recovering the hydroxylated products which will be obvious to those skilled in the art may be employed if desired.

The hydroxylated dehydroabietic acid or hydroxylated dehydroabietic acid derivatives which are prepared in accordance with the improved process of this invention are useful for a number of purposes, such as for anti-oxidants, for raw materials to provide resinous polymers and other reaction products.

What I claim and desire to protect by Letters Patent is:

1. The method of producing a hydroxylated dehydroabietic acid compound containing the hydrocarbon nucleus of dehydroabietic acid which comprises heating a compound selected from the group consisting of dehydroabietic acid, dehydroabietyl alcohol, dehydroabietinal, dehydroabietane, esters of dehydroabietic acid, salts of dehydroabietic acid, ethers of dehydroabietyl alcohol, and alkoxides of dehydroabietyl alcohol and which compound contains a halogen substituent in its aromatic nucleus at a temperature within the range of about 200° C. to about 320° C. with an alkaline material selected from the group consisting of alkali metal and alkaline earth metal hydroxides.

2. The method of producing a hydroxylated dehydroabietic acid compound containing the hydrocarbon nucleus of dehydroabietic acid which comprises heating a compound selected from the group consisting of dehydroabietic acid, dehydroabietyl alcohol, dehydroabietinal, dehydroabietane, esters of dehydroabietic acid, salts of dehydroabietic acid, ethers of dehydroabietyl alcohol, and alkoxides of dehydroabietyl alcohol and which compound contains a halogen substituent in its aromatic nucleus at a temperature within the range of about 280° C. to about 310° C. with an alkaline material selected from the group consisting of alkali metal and alkaline earth metal hydroxides.

3. The method of producing a hydroxylated dehydroabietic acid compound containing the hydrocarbon nucleus of dehydroabietic acid which comprises heating a compound selected from the group consisting of dehydroabietic acid, dehydroabietyl alcohol, dehydroabietinal, dehydroabietane, esters of dehydroabietic acid, salts of dehydroabietic acid, ethers of dehydroabietyl alcohol, and alkoxides of dehydroabietyl alcohol and which compound contains a halogen substituent in its aromatic nucleus at a temperature within the range of about 200° C. to about 320° C. with an alkali metal hydroxide.

4. The method of producing a hydroxylated dehydroabietic acid compound containing the hydrocarbon nucleus of dehydroabietic acid which comprises heating a compound selected from the group consisting of dehydroabietic acid, dehydroabietyl alcohol, dehydroabietinal, dehydroabietane, esters of dehydroabietic acid, salts of dehydroabietic acid, ethers of dehydroabietyl alcohol, and alkoxides of dehydroabietyl alcohol and which compound contains a halogen substituent in its aromatic nucleus at a temperature within the range of about 200° C. to about 320° C. with potassium hydroxide.

5. The method of producing a hydroxylated dehydroabieteic acid compound containing the hydrocarbon nucleus of dehydroabieteic acid which comprises heating a compound selected from the group consisting of dehydroabietic acid, dehydroabietyl alcohol, dehydroabietinal, dehydroabietane, esters of dehydroabietic acid, salts of dehydroabietic acid, ethers of dehydroabietyl alcohol, and alkoxides of dehydroabietyl alcohol and which compound contains a halogen substituent in its aromatic nucleus at a temperature within the range of about 200° C. to about 320° C. with an alkaline earth metal hydroxide.

6. The method of producing a hydroxylated dehydroabietic acid compound containing the hydrocarbon nucleus of dehydroabietic acid which comprises heating a compound selected from the group consisting of dehydroabietic acid, dehydroabietyl alcohol, dehydroabietinal, dehydroabietane, esters of dehydroabietic acid, salts of dehydroabietic acid, ethers of dehydroabietyl alcohol, and alkoxides of dehydroabietyl alcohol and which compound contains a halogen substituent in its aromatic nucleus at a temperature within the range of about 200° C. to about 320° C. with an alkaline material selected from the group consisting of alkali metal and alkaline earth metal hydroxides in the presence of a catalyst for the reaction.

7. The method of producing a hydroxylated dehydroabietic acid which comprises heating dehydroabietic acid having a halogen substituent in its aromatic nucleus at a temperature within the range of about 200° C. to about 320° C. with an alkali metal hydroxide.

8. The method of producing a hydroxylated dehydroabietic acid which comprises heating dehydroabietic acid having a halogen substituent in its aromatic nucleus at a temperature within the range of about 280° C. to about 310° C. with an alkali metal hydroxide.

9. The method of producing a hydroxylated dehydroabietic acid which comprises heating dehydroabieteic acid having a halogen substituent in its aromatic nucleus at a temperature within the range of about 280° C. to about 310° C. with an alkali metal hydroxide in the presence of a catalyst for the reaction.

10. The method of producing a hydroxylated dehydroabietic acid which comprises heating dehydroabietic acid having a bromine substituent in its aromatic nucleus at a temperature within the range of about 280° C. to about 310° C. with an alkali metal hydroxide.

11. The method of producing a hydroxylated dehydroabietic acid which comprises heating dehydroabietic acid having a chlorine substituent in its aromatic nucleus at a temperature within the range of about 280° C. to about 310° C. with an alkali metal hydroxide.

12. The method of producing a monohydroxylated dehydroabietic acid which comprises heating dehydroabietic acid having one bromine substituent in its aromatic nucleus at a temperature within the range of about 280° C. to about 310° C. with an alkali metal hydroxide.

13. The method of producing a monohydroxylated dehydroabieteic acid which comprises heating dehydroabieteic acid having one chlorine substituent in its aromatic nucleus at a temperature within the range of about 280° C. to about 310° C. with an alkali metal hydroxide.

WILLIAM P. CAMPBELL.